Oct. 7, 1941.   R. M. NARDONE   2,258,159
ENGINE STARTER GEARING
Filed Feb. 20, 1940
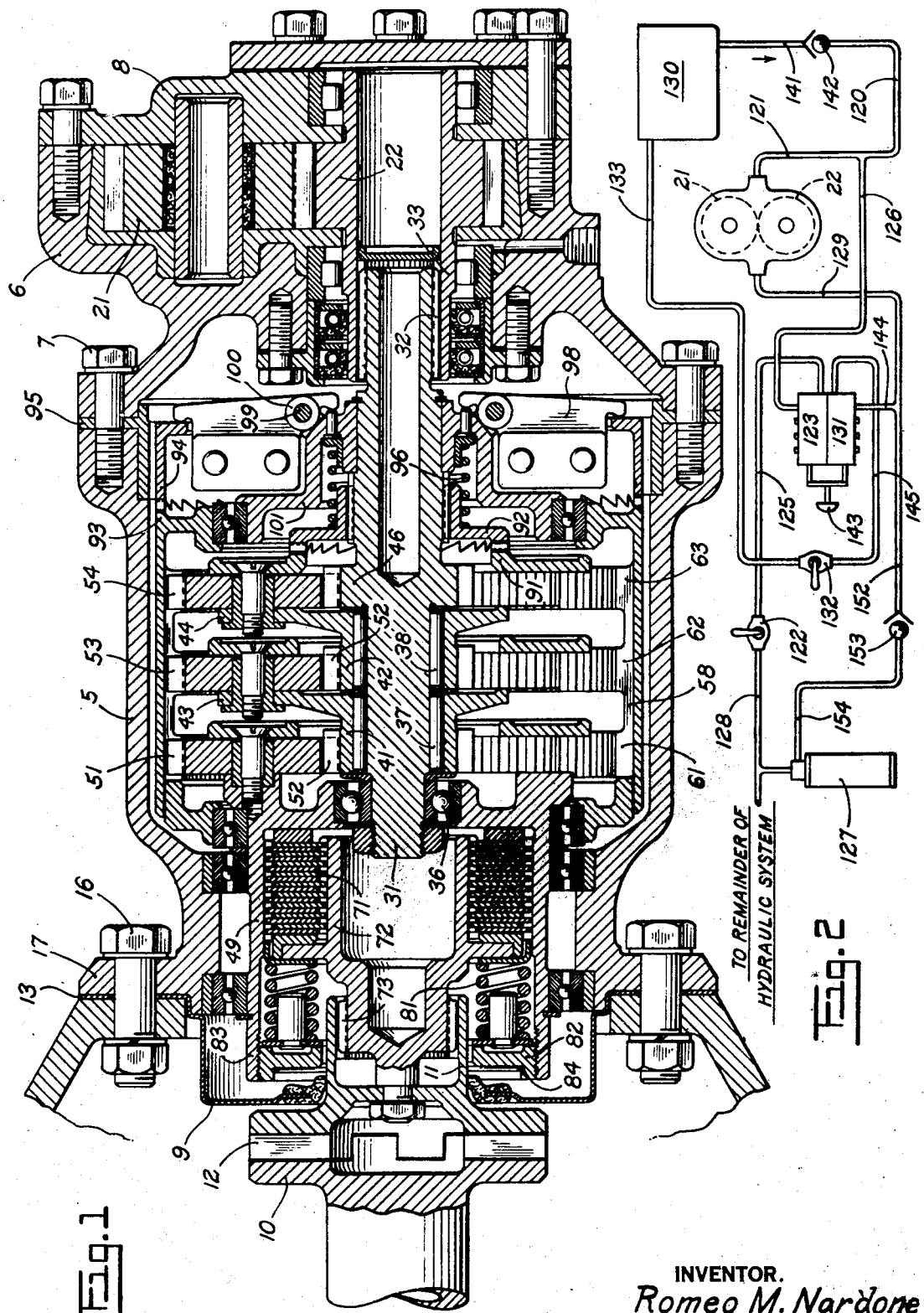
INVENTOR.
Romeo M. Nardone
BY Martin J. Finnegan
ATTORNEY.

Patented Oct. 7, 1941

2,258,159

UNITED STATES PATENT OFFICE 2,258,159

ENGINE STARTER GEARING

Romeo M. Nardone, East Orange, N. J., assignor to Bendix Aviation Corporation, South Bend, Ind., a corporation of Delaware Application February 20, 1940, Serial No. 319,955

6 Claims. (Cl. 123—179)

This invention relates to hydraulic systems, and particularly to the pressure-generating unit of such systems.

An object of the invention is to provide a pressure-generating unit adapted for inter-relation with an interval combustion engine in such manner that it may convert energy received from a storage unit into mechanical effort by which initial rotary movement may be imparted to the crankshaft of such an engine, after which the said crankshaft may constitute the driving means whereby the pressure-generating unit functions to re-energize the storage unit through the same hydraulic connections.

A further object of the invention is to provide means whereby the driving connection between the fluid-receiving elements of the pressure-generating mechanism and the engine crankshaft serves to transmit torque from one to the other at a different multiplication ratio, depending upon the direction of torque transmission.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

In the drawing:

Fig. 1 is a longitudinal sectional view of a device embodying the invention; and Fig. 2 is a diagrammatic view of the device as applied to the hydraulic system.

Referring to the drawing, reference characters 5 and 6 designate two parts of a sectional housing joined together by suitable fastening means 7, the outer section 6 being closed by an end-plate 8 and the inner section by an annular cup-shaped element 9, the central portion of which has oil-sealing registry with the hub portion 11 of a jaw-clutch member 12 adapted to drivably engage a correspondingly-shaped clutch element 10, secured to or drivably connected with the crankshaft of an internal combustion engine. The flanged portion 13 of the member 9 has openings adapted to receive bolts 16 in the flanged portion 17 of the housing section 5, both said flanged portions 13 and 17 being adapted to register with a correspondingly-positioned flange of the engine crankcase which supports the unit shown.

Within the housing section 6 are intermeshed spur gears 21 and 22 constituting the pumping elements of the unit during normal running of the associated internal combustion engine, and also constituting a prime mover for converting the fluid energy received from the hydraulic pressure source (127, Fig. 2) into mechanical effort for imparting initial rotary movement to the engine crankshaft, by way of the gear train and torque limiting clutch mechanism interposed between the pump element 22 and the engine-engaging clutch element 12.

As shown, such connections include a central shaft element 31 having one end splined as indicated at 32 for engagement with corresponding splines of the hollow hub extension 33 of the pump element 22; the opposite end of the shaft 31 being piloted in a series of bearings as indicated at 36, 37 and 38, two of which bearings rotatably support the hub portions 41 and 42 of a pair of carrier elements 43 and 44, respectively, constituting rotating supports for two corresponding series of planet elements of the planetary gear train whose high speed end is constituted by the sun pinion 46 which, as shown, is integral with the shaft 31 at approximately the central section thereof; the low speed end of the planetary system being shown as taking the form of a hollow cylinder or barrel 49, one end of which is substantially closed and constitutes a rotatable carrier for the planet pinions 51 which constitute the third series of planet elements of the system and which, as shown, are in driving connection with a sun pinion 52 formed on the hub 41 of the planet carrier 43. As shown, the three sets of planet elements 51, 53 and 54 have a common orbital track 58 on which are formed three identically pitched sets of gear teeth forming, in effect, three internally-toothed annular gears 61, 62 and 63 for meshing relationship with the planetary pinions 51, 53 and 54, respectively, as the latter revolve about their individual axes and rotate about a common axis which is the axis of the shaft 31.

The driving connection between the barrel 49 in which the planetary system terminates and the engine engaging clutch element 12, preferably includes a torque-limiting clutch assembly composed of interleaving friction discs 71 having splined engagement in alternation with the barrel 49 on the one hand, and the hollow shaft 72 on the other, which shaft 72 has additional splines 73 for engagement with corresponding splines on the hub 11 of the clutch element 12. The engaging pressure upon the friction discs 71 is due to provision of a series of coiled compression-springs 81 with which is associated an annular externally-threaded pressure-applying plate 82 adapted to be locked in the adjusted position with respect to the internally-threaded end-portion 83 of the shaft 49, the locking means, as shown, being in the form of an expansion clamp 84 whose end (not shown) passes radially through the rim of plate 82 to engage in a slot in the member 83 and thus lock the assembly together.

The means whereby the torque multiplication ratio is maintained at a relatively high value during the engine-starting operation and thereafter reduced (to prevent excessively high speed of the pumping elements 21 and 22 with respect to the engine crankshaft speed during normal running of the engine) includes a pair of one-way driving connections one of which takes the form of ratchet elements 91 and 92 and the other of which is constituted by similar ratchet elements 93 and 94, the former set being constantly urged into inter-engagement by coiled compression-spring 96, which spring also acts through interposed centrifugal weight elements 98 to yieldably hold ratchet elements 93 and 94 in engagement until such time as the speed of rotation of the entire gear train (and hence weight carrier 101) becomes sufficient not only to throw the weights 98 about their respective pivots 99, but also to throw the ratchet element 94 away from engagement with its associated element 93. As shown, ratchet element 93 is integral with orbit gear 58, while ratchet element 94 is splined to stationary member 95, hence held against rotation at all times, although slidable axially in the manner just described. Pins 99 are journaled in bearings 100 extending from a cup-shaped weight-carrier 101 keyed to shaft 31, to rotate therewith.

To begin the cycle of operation, valve 122 (see Fig. 2) is opened and selector valves 123 and 131 are thrown (by the common control handle 143) to positions in which conduits 125 and 126, also conduits 144 and 145, intercommunicate. Liquid under pressure then passes from accumulator 127 to the starter by way of conduits 128, 125, 126, 120 and 121, the latter terminating in the pump housing. Rotation is thus imparted to the gears 21 and 22, and thence to the engine crankshaft by way of intervening elements 31, 46, 54, 42, 53, 41, 51, 49, 71, 72, 73 and 12, heretofore indicated; the orbital gear 58 being held stationary by the ratchet teeth of fixed element 94. The liquid is discharged on the opposite side of gears 21 and 22, to conduit 129, and from there to the reservoir 130, the return path including conduit 144, return flow selector valve 131, conduit 145, the shut-off valve 132, and the conduit 133.

As soon as the engine starts, the operator closes communication between conduits 125 and 126 (by appropriate shifting of valve 143) and the gears 21 and 22 now pump liquid from reservoir 130, by way of conduit 141, non-return valve 142 and conduits 120 and 121, and deliver the pumped liquid to the accumulator 127, by way of conduit 129, conduit 152, non-return valve 153, and conduit 154. This delivery replenishes the supply of liquid under pressure in accumulator 127, so that the latter may continue to serve the needs of the entire hydraulic system, not only during continued operation of the engine, but also during subsequent starting thereof. During this pumping phase of operation the drive from engine member 12 to the pump gear 22 is at a one-to-one ratio, for all planet elements now rotate as a unit due to the locking of ratchet teeth 91, 92 and the separation of ratchet teeth 93, 94, wherefore orbital gear 58 is freed to rotate; and the speed of rotation being the same as that of engine member 12, it follows that there will be sufficient centrifugal force to hold weights 98 in the "swung-out" position, thereby preventing any possible return of ratchet element 94 to the gear-engaging position shown in Fig. 1, until such time as the engine stops, whereupon the decelerating weights 98 will be swung back (by spring 96) to the position shown in Fig. 1, thus carrying the ratchet element 94 back into engagement with teeth 93.

What I claim is:

1. In a starter for internal combustion engines, a shaft connected to the engine, an orbit gear normally rotatable with said shaft, a plurality of planetary gears mounted on said shaft and constantly meshed with said orbit gear, means holding said orbit gear stationary during the cranking process, said means including weighted elements responsive to centrifugal force, and means operative when the engine attains normal running to render said weighted elements ineffective to prevent rotation of said orbit gear.

2. In a starter for internal combustion engines, a shaft connected to the engine, an orbit gear normally rotatable with said shaft, a plurality of planetary gears mounted on said shaft and constantly meshed with said orbit gear, means holding said orbit gear stationary during the cranking process, said means including weighted elements responsive to centrifugal force, and means operative when the engine attains normal running speed to render said weighted elements ineffective to prevent rotation of said orbit gear, said last-named means including a second shaft rotatable with said planetary gears and a member carrying said weighted elements and keyed to said shaft, to rotate therewith during normal running of the engine.

3. In a starter for internal combustion engines, the combination, with an orbit gear, of a plurality of planetary gears constantly meshed with said orbit gear, means holding said orbit gear stationary during the cranking process, said means including weighted elements responsive to centrifugal force, and means operative when the engine attains normal running speed to render said weighted elements ineffective to prevent rotation of said orbit gear.

4. In a starter for internal combustion engines, a driving gear, a driven gear normally rotatable with the engine, a reactance gear constantly meshed with both said driving and driven gears, means holding said driven gear stationary during the cranking process, said holding means including weighted elements rotatable with said driving gear, and means operative when the engine attains normal running speed to render said weighted elements ineffective to prevent unitary rotation of all said gears.

5. In a starter for internal combustion engines, a driving gear, a driven gear normally rotatable with the engine, a reactance gear constantly meshed with both said driving and driven gears, and means holding said driven gear stationary during the cranking process, said holding means including weighted elements rotatable with said driving gear, but ineffective as a rotation preventing means after being accelerated to normal running speed of the engine.

6. In a starter for internal combustion engines, a driving gear, a driven gear normally rotatable with the engine, means holding said driven gear stationary during the cranking process, said holding means including weighted elements rotatable with said driving gear, and means operative when the engine attains normal running speed to render said weighted elements ineffective to prevent unitary rotation of all said gears.

ROMEO M. NARDONE.